US012768204B2

(12) United States Patent
Burk et al.

(10) Patent No.: US 12,768,204 B2
(45) Date of Patent: Oct. 20, 2026

(54) PORTABLE ELECTRONIC LOCK

(71) Applicant: ABUS AUGUST BREMICKER SÖHNE KG, Wetter-Volmarstein (DE)

(72) Inventors: Martin Burk, Breidenbach (DE); Christian Johannes Jerger, Dortmund (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 274 days.

(21) Appl. No.: 18/686,521

(22) PCT Filed: Aug. 16, 2022

(86) PCT No.: PCT/EP2022/072864
§ 371 (c)(1),
(2) Date: Feb. 26, 2024

(87) PCT Pub. No.: WO2023/025623
PCT Pub. Date: Mar. 2, 2023

(65) Prior Publication Data

US 2024/0360697 A1 Oct. 31, 2024

(30) Foreign Application Priority Data

Aug. 27, 2021 (DE) ..................... 10 2021 122 250.8

(51) Int. Cl.
*E05B 47/00* (2006.01)
*E05B 67/18* (2006.01)

(52) U.S. Cl.
CPC .......... *E05B 47/0012* (2013.01); *E05B 67/18* (2013.01); *E05B 2047/0058* (2013.01); *E05B 2047/0082* (2013.01)

(58) Field of Classification Search
CPC ................. E05B 47/0012; E05B 67/18; E05B 2047/0058; E05B 2047/0082
See application file for complete search history.

(56) References Cited

U.S. PATENT DOCUMENTS 1,135,281 A * 4/1915 Hawkins ................... A47F 3/06 312/274
5,377,511 A * 1/1995 Meckbach ............ E05B 67/063 70/389

(Continued)

FOREIGN PATENT DOCUMENTS

CN 210598521 U 5/2020
CN 112377010 A 2/2021

(Continued)

OTHER PUBLICATIONS

German Office Action regarding Patent Application No. 102021122250.8, dated Apr. 13, 2022.

(Continued)

*Primary Examiner* — Mark A Williams
(74) *Attorney, Agent, or Firm* — Harness, Dickey & Pierce, P.L.C.

(57) ABSTRACT

A portable electronic lock comprises a lock body and a securing part that is movable relative to the lock body between a closed position and an open position, wherein the lock body comprises an electromechanical locking device that has an electric motor having a rotor, a latch coupled to the rotor, and a control circuit. The latch can be electrically driven by means of the electric motor from a locking position, in which the securing part located in the closed position is locked to the lock body, into an unlocking position in which the securing part is released for a movement into the open position. A mechanical driving of the latch can be effected by a moving of the securing part from the open position into the closed position, with the latch being drive-effectively coupled to the rotor of the electric motor such that the mechanical driving of the latch effects a forced rotational movement of the rotor. The control circuit (Continued)

is configured to detect the forced rotational movement of the rotor.

20 Claims, 4 Drawing Sheets

(56) References Cited

U.S. PATENT DOCUMENTS

| | | | | |
|---|---|---|---|---|
| 8,850,858 | B2 * | 10/2014 | Nave | E05B 47/06 70/279.1 |
| 9,556,651 | B1 * | 1/2017 | Cabral Herrera | E05B 67/22 |
| 10,119,303 | B2 * | 11/2018 | Garthe | F16P 3/08 |
| 10,221,592 | B2 * | 3/2019 | Rodaer | E05B 67/24 |
| 10,422,163 | B1 * | 9/2019 | Cabral Herrera | E05B 67/22 |
| 10,614,641 | B2 * | 4/2020 | Lai | E05B 67/24 |
| 11,105,123 | B1 * | 8/2021 | Ruffkess | E05B 67/22 |
| 11,193,309 | B1 * | 12/2021 | Cabral Herrera | E05B 67/22 |
| 2008/0024272 | A1 | 1/2008 | Fiske | |
| 2022/0282527 | A1 | 9/2022 | Banse | |

FOREIGN PATENT DOCUMENTS

| | | | |
|---|---|---|---|
| DE | 19639235 | A1 | 3/1998 |
| DE | 4323693 | C2 | 7/2002 |
| DE | 102014105432 | A1 | 10/2015 |
| DE | 102019113184 | A1 | 11/2020 |
| EP | 0831196 | A2 | 3/1998 |
| TW | 201814123 | A | 4/2018 |
| WO | WO-2009036585 | A1 | 3/2009 |
| WO | WO-2010105374 | A1 | 9/2010 |

OTHER PUBLICATIONS

International Search Report of the ISA issued in PCT/EP2022/072864, mailed Dec. 20, 2022; ISA/EP.

Written Opinion of the ISA issued in PCT/EP2022/072864, mailed Dec. 20, 2022; ISA/EP.

Apr. 16, 2018 First Office Action issued in Taiwan application No. 201814123.

* cited by examiner

PORTABLE ELECTRONIC LOCK

CROSS-REFERENCE TO RELATED APPLICATIONS

This application is a U.S. National Phase Application under 35 U.S.C. 371 of International Application No. PCT/EP2022/072864, filed on Aug. 16, 2022, which claims the benefit of German Patent Application No. 10 2021 122 250.8, filed on Aug. 27, 2021. The entire disclosure of the above German patent application is incorporated herein by reference.

The invention relates to a portable electronic lock, comprising a lock body and a securing part that is movable relative to the lock body between a closed position and an open position. The lock body has an electromechanical locking device that has an electric motor having a rotor, a latch coupled to the rotor, and a control circuit. The latch may be electrically driven by means of the electric motor from a locking position, in which the securing part located in the closed position is locked to the lock body, into an unlocking position in which the securing part is released for a movement into the open position.

Such a portable electronic lock is known from DE 10 2019 113 184 A1. A padlock having a purely mechanical locking mechanism, which has a rotating latch, is known from DE 43 23 693 C2.

Such a portable electronic lock may, for example, be controllable by means of an electronic key, by entering a code at a numerical input device of the lock body, by a biometric authentication (e.g. by means of a fingerprint sensor), or by remote control by a mobile end device (e.g. a smartphone), in particular in order to unlock the securing part on the basis of an unlocking command that is hereby transmitted to the control circuit.

In some applications, it is desirable to be able to monitor the position of the securing part, for instance in order to avoid malfunctions on a closing and locking of the securing part, and/or to be able to display information about the state of the portable lock or to be able to transmit said information to an associated central unit or remote control unit.

It is an object of the invention to be able to detect the position of the securing part with little effort and small space requirements in a portable electronic lock of said kind and/or to be able to output a corresponding signal (e.g. state information or a command).

This object is satisfied by a portable electronic lock having the features of claim 1 and in particular in that a mechanical driving of the latch may be effected by a moving of the securing part from the open position into the closed position. The latch is drive-effectively coupled to the rotor of the electric motor such that the mechanical driving of the latch effects a forced rotational movement of the rotor. The electric motor is configured to generate an electrical voltage on the basis of the forced rotational movement of the rotor.

In the portable electronic lock in accordance with the invention, a movement of the securing part from the open position into the closed position by the user (for example, by an introduction of the securing part into the lock body) directly or indirectly effects a mechanical driving of the latch. This may, for example, take place by a direct displacement of the latch or by a triggering of a preloaded return spring, as will be explained in the following.

Due to the drive-effective coupling of the latch to the rotor of the electric motor, a movement of the latch effected by the mechanical driving is at least partly transmitted to the rotor of the electric motor. This may in particular be a movement of the latch in the locking direction and/or a movement of the latch in the unlocking direction. The latch may in particular be permanently coupled to the rotor of the electric motor for this purpose. However, the drive-effective coupling does not preclude a certain clearance from being present between the latch and the rotor. In some embodiments, such a (slight) clearance may even be advantageous, in particular to relieve the rotor when the latch is preloaded by means of a spring. The latch may move into the locking position due to the mechanical driving or due to a further control of the electric motor in order to fix the securing part to the lock body.

The forced rotational movement of the rotor effected by the user by the mechanical driving of the latch causes an electrical voltage in the electric motor (in particular in the motor windings), for example by induction. The electrical voltage caused on the basis of the mechanical driving of the latch may be utilized, in particular by a detection and/or an acquisition of electrical energy. In some embodiments, the generated electrical voltage may in particular be detected by the control circuit such that the closed position of the securing part may hereby be indirectly detected. The detection of the closed position of the securing part may subsequently be used as a basis for the control of the lock or for a state monitoring. Alternatively or additionally, in some embodiments, the caused electrical voltage may be at least partly stored as electrical energy (so-called "energy harvesting"). This generated energy may in particular only be temporarily buffered, for example, to be able to subsequently output an electrically generated signal. These possible applications will be explained in more detail in the following.

An advantage of the invention is that the anyway present electric motor is used to detect the closed position of the securing part and/or to acquire electrical energy, for example, to be able to output a closed position determination signal. Since no separate sensor is required to detect the closed position, both costs and installation space may be saved and a susceptibility of the mode of operation to malfunctions (for instance, due to a contamination of a separate sensor) is reduced or avoided completely. If the generated electrical energy is sufficient to temporarily activate an output device (e.g. a radio transmitter or an optical indicator), no further energy source of the electronic lock is necessarily required for the output of the signal or the output of the signal may also take place when the (main) energy source is exhausted or removed.

Further embodiments of the invention will be mentioned in the following and in the dependent claims.

In some embodiments, the latch may be connected to a return spring that is configured to mechanically drive the latch from the unlocking position into the locking position. As a mechanical energy store, the return spring may thus serve to drive the rotor to perform the forced rotational movement. The forced rotational movement of the rotor may thus generate a predetermined and sufficiently high electrical voltage that may be reliably detected and/or that is sufficient to temporarily feed electrical energy to an output device of the lock for transmitting a command or state information (e.g. a radio unit or an optical indicator).

In such an embodiment, the return spring may be tensionable by the electrical driving of the latch into the unlocking position. A relaxation of the return spring may subsequently be triggered by the moving of the securing part from the open position into the closed position. The latch may be mechanically driven to perform the movement into the locking position by the relaxation of the return spring in order to effect the desired or detectable forced rotational movement of the rotor of the electric motor.

The electromechanical locking device may in particular be configured to mechanically block the latch electrically driven into the unlocking position and to release the latch for the mechanical driving only by the moving of the securing part from the open position into the closed position. For this purpose, the securing part may directly or indirectly trigger the mechanical block. In some embodiments, the control circuit may be configured, after the electrical driving of the latch into the unlocking position and the mechanical blocking of the latch in the unlocking position, to control the electric motor to slightly rotate the rotor back in the locking direction in order to relieve the rotor. The rotor of the electric motor is hereby relieved of the spring force of the preloaded spring. The slight rotation back may in particular take place in accordance with a clearance of the relative movement that is present between the rotor and the latch. However, the rotor substantially remains in a position corresponding to the unlocking position of the latch. For example, in an embodiment, the latch may be configured as a rotating latch and may be blocked by the securing part, which is located in the open position, against a return movement due to the force of the return spring, as is known from the initially mentioned DE 43 23 693 C2.

In other embodiments with a return spring, the return spring may be tensionable by the electrical driving of the latch into the unlocking position, wherein the control circuit is configured, after the electrical driving of the latch into the unlocking position, in particular after a predetermined time lapse, to control the electric motor to return the latch into the locking position and hereby to relax the return spring. In some embodiments, the mechanical energy of the return spring being released in this respect may be converted into electrical energy by the electric motor in a generator operating mode and may be stored in a rechargeable electrical energy store. Due to a subsequent moving of the securing part from the open position into the closed position, the latch may first be mechanically driven into the unlocking position, whereby the return spring connected to the latch may hereby be tensioned again. Subsequently, on a final reaching of the closed position of the securing part, the latch may again be mechanically driven from the unlocking position into the locking position by a relaxing of the spring in order to effect the desired forced rotational movement of the rotor of the electric motor. The electrical voltage that is hereby generated in the electric motor may again be utilized, in particular detected and/or converted into electrical energy.

For example, on the movement into the closed position, the securing part may temporarily urge back the preloaded latch via cooperating guide slopes, in particular in the case of a linearly movable latch. After a final reaching of the closed position of the securing part, the latch may snap into the locking position due to the force of the return spring. Since the latch is drive-effectively coupled to the rotor of the electric motor, the rotor moves accordingly and at least one of the mechanically caused latch movements (i.e. from the locking position into the unlocking position and/or from the unlocking position into the locking position) may be detected by the control circuit. Such a linearly movable, preloaded latch is, for example, known from DE 196 39 235 A1. Said latch may, for example, be coupled to the rotor of the electric motor via a gear rack, a pinion meshing therewith, and possibly a reduction gear unit, as is, for example, known from CN 210598521 U, to drive the rotor by a mechanical urging back of the latch.

In some embodiments, in particular also without a return spring, the control circuit may be configured, after the electrical driving of the latch into the unlocking position, to control the electric motor to return the latch into the locking position. This may in particular take place after a predetermined time lapse to give the user an opportunity to move the securing part from the closed position into the open position. Due to a subsequent moving of the securing part from the open position back into the closed position, the latch may be mechanically driven into the unlocking position in order hereby to effect the forced rotational movement of the rotor of the electric motor. The electrical voltage that is hereby generated in the electric motor may be utilized, in particular detected and/or converted into electrical energy. In such an embodiment, the control circuit may be configured, after the detection of the forced rotational movement of the rotor, to control the electric motor again to electrically drive the latch from the unlocking position into the locking position.

On the movement of the securing part from the open position into the closed position, the securing part may therefore mechanically drive the latch, for example via cooperating guide slopes, into the unlocking position against the resistance of the rotor of the electric motor, wherein the rotational movement of the rotor that is hereby forced is detected by the control circuit. The control circuit may use this event as a reason to then move the latch from the unlocking position into the locking position by means of the electric motor. For example, one or two latch(es) may be coupled to the rotor of the electric motor via a respective gear rack, a pinion meshing therewith, and possibly a reduction gear unit to drive the rotor by a mechanical urging back of the latch(es). Such an arrangement is known from the already mentioned CN 210598521 U, wherein guide slopes cooperating there would have to be provided at the two hoop ends and at the two latches. This embodiment has the advantage that no return spring is required.

In some embodiments, the latch may be configured as a rotating latch. Such a rotating latch is, for example, known from the initially mentioned DE 10 2019 113 184 A1 and DE 43 23 693 A1. The rotating latch may be driven by the electric motor to perform a rotational movement. In some embodiments, the rotating latch may be rotatable about an axis of rotation that extends coaxially to, in parallel with, or at an angle to an axis of rotation of the rotor of the electric motor. In some embodiments, in the locking position, the rotating latch may urge one or more blocking element(s) radially outwardly into an engagement with the securing part, wherein, in the unlocking position, the one or more blocking element(s) may be urged back radially inwardly by the securing part. For this purpose, the rotating latch may have radial recesses and elevated portions along its periphery. The blocking element(s) may be spherical or cylindrical, for example. Two such blocking elements may be arranged disposed diametrically opposite one another to effect a two-sided locking of the hoop, for example, in the case of a securing part that is configured as a U-shaped hoop. A merely one-sided locking is also possible, however. In such embodiments with a rotating latch, the return spring may in particular be configured as a torsion spring.

In some embodiments, the latch may be linearly movable. The latch may, for example, be coupled to the rotor of the electric motor via a gear rack and a pinion meshing therewith, as is known from the already mentioned CN 210598521 U.

In some embodiments, the control circuit may be configured, in an unlocking operation, to drive the electric motor to perform an electrical driving of the latch from the locking position into the unlocking position This may in particular take place on the basis of an unlocking command that is transmitted to the control circuit via an electronic key, by entering a code at a numerical input device of the lock body, by a biometric authentication, or by radio by a mobile end device.

In some embodiments, the control circuit may be configured, in a detection operation following the unlocking operation, to detect the electrical voltage generated by the electric motor or to store it as electrical energy. The term "detection operation" in this context means that the electrical voltage generated on the basis of the forced rotational movement of the rotor is utilized. The control circuit may in particular monitor the electric motor as to whether a forced rotational movement of the rotor takes place that may be effected by the user by a mechanical driving of the latch. Alternatively or additionally, the electric motor may be brought into a generator configuration for the detection operation, in which generator configuration an external drive of the rotor causes an induction of electrical voltage that may be stored in an electrical energy store, for example. For this purpose, in particular the electrical connections of motor windings (e.g. coils of the stator of the electric motor) may be adapted or switched and/or the portable electronic lock may have a rectifier such as is known to the skilled person for a generator operation of an electric motor.

The portable electronic lock may have its own electrical energy source, for example a battery or an accumulator, and/or electrical contacts for connecting an external electrical energy source. In some embodiments, the control circuit may connect the electric motor to the electrical energy source in the unlocking operation. For the detection operation, the control circuit may disconnect the electric motor from the electrical energy source.

The detection operation may directly follow the unlocking operation in some embodiments. However, in some embodiments, provision may, as already explained, be made that, after the unlocking operation (in particular after a predetermined time lapse that enables a moving of the securing part from the closed position into the open position), a locking operation first takes place, in which the control circuit drives the electric motor for an electrical working of the latch from the unlocking position into the locking position, and that the detection operation only follows thereafter.

In some embodiments, the control circuit may be configured to detect the electrical voltage that is generated by the electric motor as a result of the forced rotational movement of the rotor. The control circuit may in particular be configured to evaluate a value of the generated electrical voltage (for example with respect to amplitude, frequency, and/or polarity). In some embodiments, the control circuit may compare an electrical voltage induced by the forced rotational movement of the rotor with a threshold value. For example, the electric motor may be configured as a DC motor, wherein the control circuit is configured to compare the value of an electrical voltage signal generated by the forced rotational movement of the rotor with a threshold value. In some embodiments, the electric motor may be configured as an AC motor, wherein the control circuit is configured to compare the amplitude of an electrical AC voltage signal generated by the forced rotational movement of the rotor with a threshold value.

The successful detection of a generated voltage may in particular enable a conclusion to be drawn that the securing part of the lock has been brought into the closed position. Such a detection result may, for example, be used as a basis for the control of the electric motor or may be displayed as information about the state of the lock or may be output to an associated (external) central unit or remote control unit.

Alternatively to or in addition to such a detection of a generated voltage, the portable electronic lock may have a rechargeable electrical energy store, for example, an accumulator or a capacitor. The control circuit may be configured to store at least a portion of the electrical voltage that is generated as a result of the forced rotational movement of the rotor as electrical energy in the rechargeable electrical energy store. In some embodiments, a merely temporary buffering of the generated energy may be provided, for example, to output an associated signal (in particular a state information or an associated command) subsequent to a detection of the generated electrical voltage. Such an output may in particular take place by radio or optically, for example, by means of the radio unit mentioned below or by means of the optical indicator of the lock mentioned below.

In some embodiments, the control circuit may be connected to a radio unit. The control circuit may be configured to receive a control command (for example, an unlocking command for the electromechanical locking device or an interrogation command) via the radio unit and to control the electric motor in response to the received control command. Alternatively or additionally, the control circuit may be configured to transmit a state information, which represents the position of the securing part (closed position or open position), or a control command via the radio unit as a radio signal, for example, to an associated central unit or remote control unit (in particular to a mobile end device of the user).

In some embodiments, the portable electronic lock may have an optical indicator to which the control circuit is connected. The control circuit may be configured to output state information, which represents a position of the securing part (closed position or open position), at the optical indicator as a visually perceivable signal. The optical indicator may, for example, comprise a light-emitting diode.

In some embodiments, the rotor of the electric motor may be coupled to the latch via a reduction gear unit that is not self-locking. The fact that the reduction gear unit is not self-locking means that the reduction gear unit—at least if a sufficiently high torque is applied—may also transmit a rotational movement from the output side in the direction of the input, wherein a speeding up takes place in this direction. Thus, a compact fast-rotating electric motor may be used and a mechanical driving of the latch may nevertheless be converted into a rotational movement of the rotor. The reduction gear unit may, for example, be a single-stage or multi-stage spur gear or an epicyclic gear.

In some embodiments, the rotor of the electric motor may be coupled with clearance to the latch. Tolerances may hereby be compensated and, as explained, force paths may be interrupted. However, the clearance of the rotor of the electric motor with the latch is significantly smaller than the movement path of the rotor between the locking position and the unlocking position such that a mechanical driving of the latch may be converted into a rotational movement of the rotor.

In some embodiments, the securing part may be configured as a rigid hoop, in particular as a U-shaped hoop having limbs of equal length or having two limbs of different lengths. Such a hoop may have two ends, wherein the hoop may be introducible with both ends into the lock body and may be lockable with one end or with both ends to the lock body.

In some embodiments, the securing part may have at least one bolt that may be introducible into the lock body and that may be lockable to the lock body. The securing part may in particular have a wire rope or a chain, wherein a bolt for locking to the lock body may be attached to one end of the wire rope or of the chain and a further bolt or an eyelet may be attached to the other end.

In some embodiments, the securing part may be permanently held at the lock body, that is in particular also in the open position. In other embodiments, the securing part may be releasable from the lock body.

The lock body may have at least one introduction opening into which one end of the securing part may be introduced in the closed position.

The invention will be explained in the following only by way of example with reference to the drawings, wherein the invention is not restricted to the padlock described in the following, but may also be used with other lock types.

Figure 1:
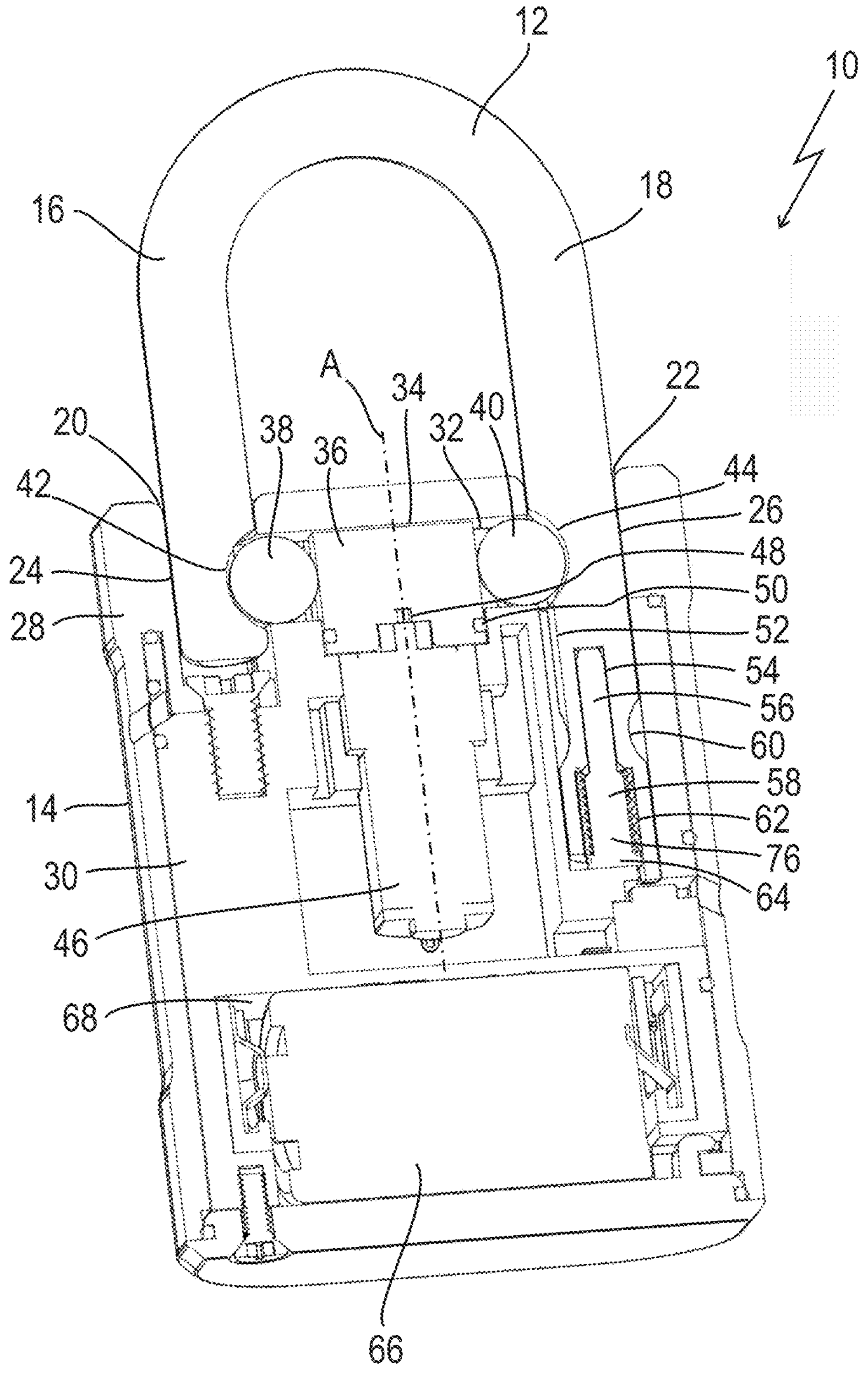
FIG. 1 shows a perspective sectional view of a padlock in a closed position of the hoop.

FIG. 1 shows a portable electronic lock in the form of a padlock 10. The padlock 10 comprises a lock body 14, which has a housing 30, and a securing part that is configured as a lock hoop 12. The lock hoop 12 is in this respect designed in a U shape and comprises a short first hoop limb 16 and a long second hoop limb 18. A first and a second introduction opening 20, 22 for the two hoop limbs 16, 18 are formed at the upper side of the lock body 14 and lead into a respective reception passage 24, 26. The lock hoop 12 may be moved relative to the lock body 14 along the longitudinal axes of the hoop limbs 16, 18 between a closed position and an open position. In this respect, the second hoop limb 18 is permanently held in the lock body 14, wherein the second hoop limb 18 is inserted through the introduction opening 22 into the lock body 14 and is guided in the second reception passage 26. The first, shorter hoop limb 16 is located outside the lock body 14 in the open position of the lock hoop 12. In the closed position of the lock hoop 12, the first hoop limb 16 is inserted through the introduction opening 20 into the first reception passage 24.

To be able to lock the lock hoop 12 in the closed position, the padlock 10 comprises an electromechanical locking device 34. The electromechanical locking device 34 comprises a latch that is configured as a rotating latch 36 in the embodiment shown and that drives two blocking elements 38, 40. The rotating latch 36 and the blocking elements 38, 40 are received in a transverse bore 32 that extends between the first reception passage 24 and the second reception passage 26 in the upper region of the housing 30. The electromechanical locking device 34 further comprises an electric motor 46, which has a stator, a rotor and a reduction gear unit (not shown separately), for driving the rotating latch 36 as well as a control circuit 102 (see FIG. 6). In this respect, the electric motor 46 is attached in a cut-out of the housing 30 such that the axis of rotation A of the rotor of the electric motor 46 coincides with the axis of rotation A of the rotating latch 36 and an output-side entrainer 48 of the electric motor 46 is connected in a form-fitting manner to the rotating latch 36. Instead of such a coaxial arrangement, an angle (e.g. 90 degrees) between the axis of rotation of the rotor of the electric motor 46 and the axis of rotation A of the rotating latch 36 may generally also be provided, in particular due to an angular gear.

The rotating latch 36 is coupled to the rotor of the electric motor 46 via said reduction gear unit, wherein the reduction gear unit slows down rotational movements of the rotor. The reduction gear unit is not self-locking such that the reduction gear unit transmits rotational movements in both directions. The reduction gear unit may, for example, be a single-stage or a multi-stage spur gear (in particular with a coaxial input and output) or an epicyclic gear (e.g. a planetary gear set). The electric motor 46 is supplied with energy by a battery 66 that is located in a battery compartment 68 in a cut-out at the lower end of the housing 30. Alternatively, an energy supply may also be provided from external, for example, via two electrical contacts (not shown).

The padlock 10 shown not only allows the lock hoop 12 to be electromechanically unlocked, as will be explained in the following. The padlock 10 shown furthermore also allows a mechanical driving of the rotating latch 36 to be effected by a moving of the lock hoop 12 from the open position into the closed position (due to a corresponding actuation by the user). The rotating latch 36 is again drive-effectively coupled to the rotor of the electric motor 46 such that the rotor of the electric motor 46 is hereby also driven in a detectable manner, as will likewise be explained in the following. In some embodiments, electrical energy may hereby also be acquired in that the electric motor 46 is operated in a generator mode.

To lock the padlock 10, the two blocking elements 38, 40 are located in the transverse bore 32 between the hoop limbs 16, 18 and the rotating latch 36. The blocking elements 38, 40 are formed as spheres by way of example. In the closed position of the electronic lock 10, to lock the lock hoop 12, the one blocking element 38 is urged from the outer periphery of the rotating latch 36 into a first engagement recess 42 of the first hoop limb 16 and the other blocking element 40 is urged from the outer periphery of the rotating latch 36 into a second engagement recess 44 of the second hoop limb 18. For an automatic purely mechanical locking of the lock hoop 12, a return spring 50 is provided that is effective between the housing 30 and the rotating latch 36 and that is configured as a torsion spring. The return spring 50 is configured to mechanically drive the rotating latch 36 from the unlocking position into the locking position. This may be triggered in that the lock hoop 12 is displaced from the open position, in which the hoop limb 18 blocks the rotating latch 36 by means of the respective locking element 40 in the unlocking position, into the closed position. In the closed position of the lock hoop 12, the second engagement recess 44 of the hoop limb 18 releases the respective blocking element 40 for a radially outward movement, whereby the rotating latch 36 is released for a rotational movement due to the spring force of the tensioned return spring 50. This mode of operation is generally known from the initially mentioned DE 43 23 693 C2.

In the embodiment shown, the unlocking of the lock hoop 12 takes place in an electromechanical manner in that the electric motor 46 rotates the rotating latch 36 into the unlocking position, wherein the return spring 50 is tensioned. In the unlocking position of the rotating latch 36, the blocking elements 38, 40 may move back radially inwardly from the engagement recesses 42, 44 of the lock hoop 12 with respect to the axis of rotation A. The lock hoop 12 is thus released for a movement from the closed position into the open position, wherein an ejection mechanism is provided such that the lock hoop 12 automatically jumps in the direction of the open position as a result of the unlocking. The rotating latch 36 is hereby, as explained above, blocked in the unlocking position by the long second hoop limb 18 and the associated blocking element 40. At least for this unlocking process, the electric motor 46 has to be supplied with electrical energy by the battery 66 or by an externally connected energy source.

In the embodiment shown, the ejection mechanism for the lock hoop 12 is configured as follows: A blind bore 54 is present at the lower end of the second hoop limb 18. The blind bore 54 is divided into two regions 56, 58, wherein the lower region 58 has a larger diameter than the upper region 56. A correspondingly shaped pin 76 is introduced in the blind bore 54. The pin 76 consists of three parts: in the upper region 56, the pin 76 has the same diameter as the blind bore 54 in this upper region 56; in the lower region 58 of the blind bore 54, the pin 76 has a slightly smaller diameter than the blind bore 54 in this lower region 58, wherein an ejection spring 62 is introduced between the pin 76 and the blind bore 54 in this lower region 58; at the lower end of the pin 76, a plate head 64 is located as a termination of the pin 76. The ejection spring 62 is supported at the plate head 64 of the pin 76 and pushes the second hoop limb 18, and thus the lock hoop 12, upwardly on the unlocking of the lock 10 such that the first hoop limb 16 exits the first introduction opening 20.

Figure 2:
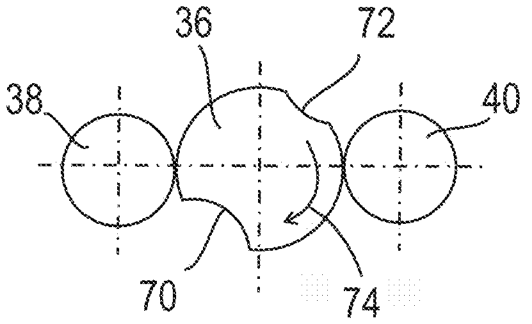
FIG. 2 shows a plan view of a rotating latch in a locking position, including blocking elements.
Figure 3:
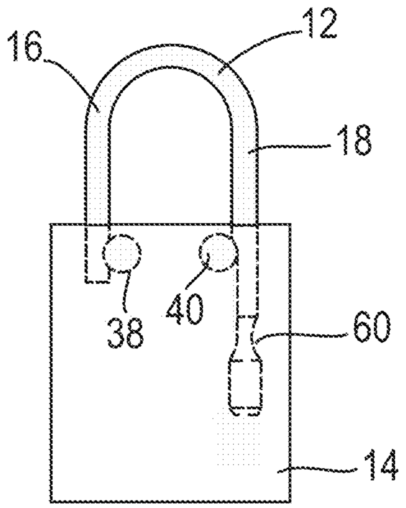
FIG. 3 shows a side view of parts of the padlock in the closed position of the hoop.

The cooperation between the rotating latch 36 and the blocking elements 38, 40 is illustrated in FIG. 2 to FIG. 5. The respective position of the rotating latch 36 and the lock hoop 12 can be seen from these Figures. FIG. 2 shows a plan view of the rotating latch 36 in the locking position of the rotating latch 36, while the lock hoop 12 is located in the closed position. FIG. 3 shows the corresponding side view of the padlock 10. In the locking position of the rotating latch 36, the blocking elements 38, 40 are urged radially outwardly by the outer surfaces of the rotating latch 36 and engage into the first engagement recess 42 of the first hoop limb 16 or into the second engagement recess 44 of the second hoop limb 18. The lock hoop 12 is thereby locked in the lock body 14.

Figure 4:
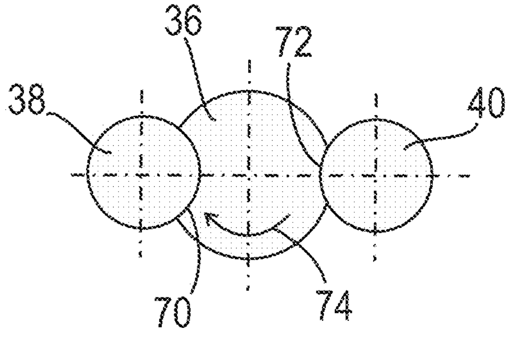
FIG. 4 shows a plan view corresponding to FIG. 2 of the rotating latch in an unlocking position, including blocking elements.
Figure 5:
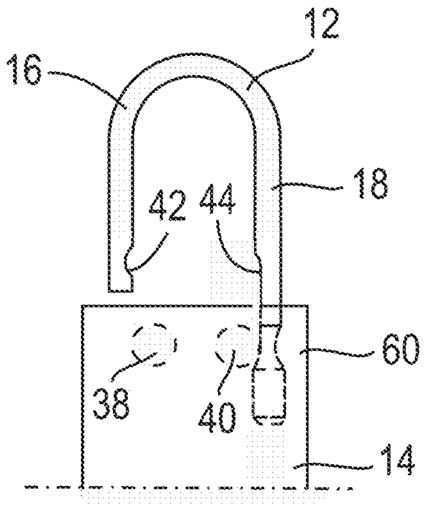
FIG. 5 shows a side view corresponding to FIG. 3 of parts of the padlock in an open position of the hoop.

Starting from this state, the rotating latch 36 is moved in the direction of rotation 74 by means of the rotor of the electric motor 46 for an unlocking. The rotation takes place until the first blocking element 38 is released for a movement back into a first recess 70 and the second blocking element 40 is released for a movement back into a second recess 72 of the rotating latch 36. FIG. 4 shows the rotating latch 36 in the unlocking position. The ejection spring 62, which is preloaded in the closed position of the lock hoop 12, now pushes the lock hoop 12 in the direction of the open position until the second blocking element 40 engages into a further recess 60 that is formed in the shape of an annular groove at the lower end of the second hoop limb 18. The lock hoop 12 is hereby secured at the lock body 14 and may be rotated about its vertical axis. FIG. 5 shows a side view of the padlock 10 in the open position.

Figure 6:
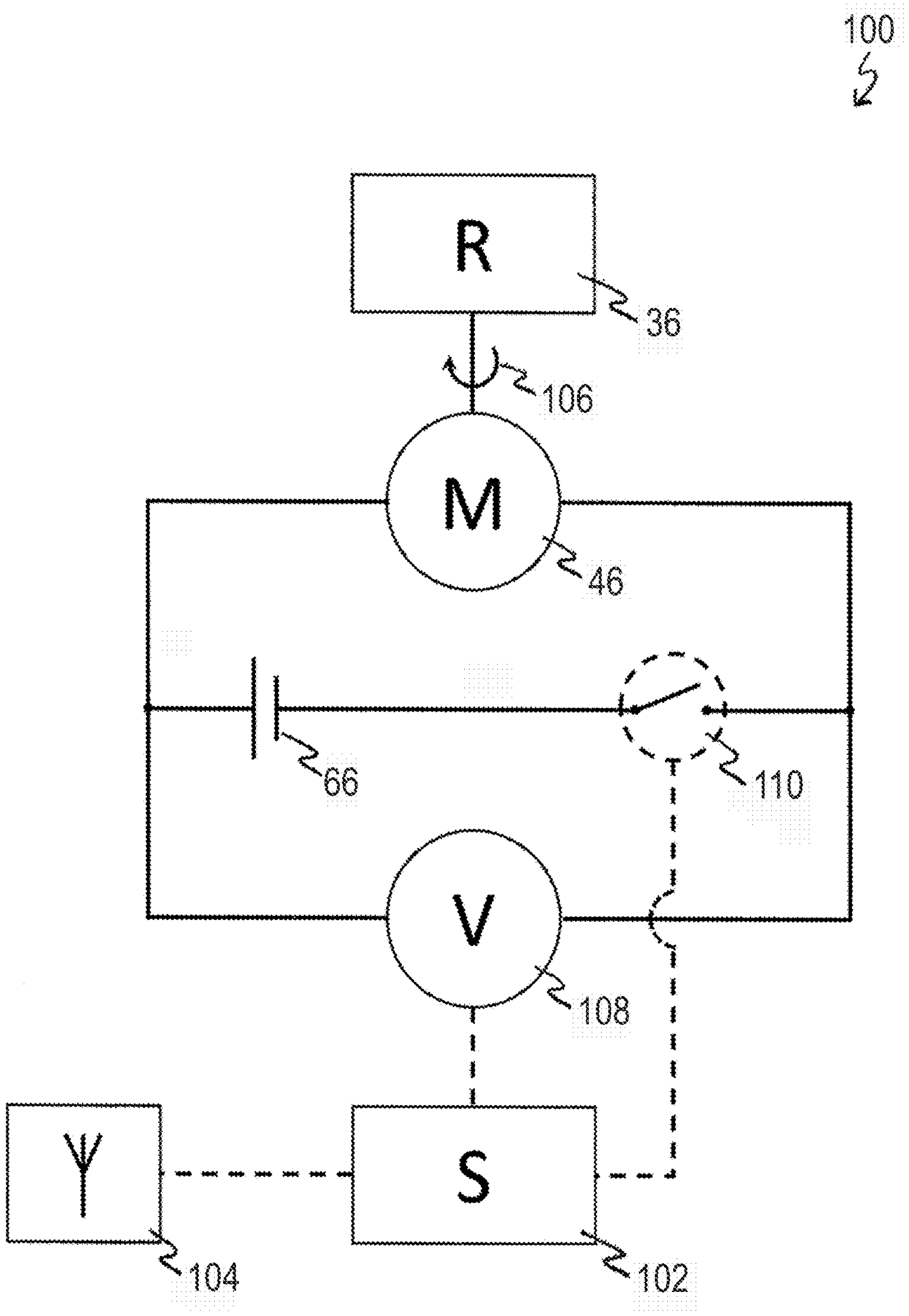
FIG. 6 shows a circuit for detecting a forced rotational movement of a rotor.

FIG. 6 shows a block diagram 100 of the major electrical and electronic components of the padlock 10. In accordance with the above explanations, in an unlocking operation, a control circuit 102 may control the electric motor 46 to drive the rotating latch 36, by means of the rotor of the electric motor 46, to perform a rotational movement in the direction of rotation 74 (cf. FIGS. 2 and 4) in order to rotate the rotating latch 36 from the locking position (FIG. 2) into the unlocking position (FIG. 4). For this purpose, the electric motor 46 is supplied with electrical energy by the battery 66. The control circuit 102 may, for example, comprise a microprocessor and additional switches (e.g. transistors).

In the padlock 10, the rotating latch 36 is drive-effectively coupled to the rotor of the electric motor 46 such that—in a reverse direction—a mechanical driving of the rotating latch 36 via the entrainer 48 (FIG. 1) effects a forced rotational movement 106 of the rotor of the electric motor 46. The control circuit 102 is configured, in a detection operation, to detect and to evaluate an electrical voltage induced in the motor windings by the forced rotational movement 106 of the rotor. Such a detection operation may in particular follow the unlocking operation. To detect the induced voltage, the control circuit 102 is connected to a voltage measurement device 108 (e.g. a voltmeter) and to a switch 110. By means of the switch 110, the electric motor 46 may be disconnected from the battery 66 during the detection operation (in particular in the unlocking position of the rotating latch 36). The control circuit 102 is configured, in this state, to detect an electrical voltage signal in the motor windings, which is generated by the forced rotational movement 106 of the rotor, by means of the voltage measurement device 108 and to evaluate the voltage signal. The control circuit 102 may in particular compare the voltage signal with a threshold value, wherein, on a reaching or exceeding of the threshold value, the control circuit 102 concludes that the rotating latch 36 has been mechanically driven (i.e. not by the electric motor 36) to perform a rotational movement.

Alternatively or additionally to such a (mere) detection of a driving of the rotating latch 36 effected from the outside (via the lock hoop 12), in a generator configuration of the electric motor 46, the electric motor 46 may be directly or indirectly connected to an electrical energy store (not shown) in the detection operation such that the mechanical energy being released on the locking due to the relaxation of the return spring 50 is at least partly converted into electrical energy and buffered.

In the embodiment shown, this mechanical driving of the rotating latch 36 detectable by the control circuit 102 may in particular be the rotational movement of the rotating latch 36 as a result of the force of the return spring 50. As explained above, the return spring 50 may mechanically drive the rotating latch 36 from the unlocking position into the locking position, wherein this may be triggered by the user by displacing the lock hoop 12 from the open position into the closed position.

A particular advantage of the padlock 10 described is that no additional sensor and consequently also no additional installation space for a sensor are required for such a detection of a rotational movement 106 of the rotating latch 36 that is effected from the outside. A retrofitting of existing locks, in which a rotating latch 36 or another latch is drive-effectively coupled to the rotor of an electric motor 46, with such an indirect sensor system may thus also take place relatively easily. In the case of the explained generator operation of the electric motor 46, electrical energy may be acquired and stored during the locking of the padlock 10.

It can be seen from FIG. 6 that the control circuit 102 may further be connected to a radio unit 104, wherein the control circuit 102 may be configured to receive a control command (for example, an unlocking command for the electromechanical locking device 34 or a status query command) via the radio unit 104 and, for example, to control the electric motor 46 in response to the received control command. Furthermore, the control circuit 102 may be configured to transmit requested state information, which, for example, represents the position of the lock hoop 12 (in particular the detected closed position), via the radio unit 104 as a radio signal.

A further advantage of the padlock 10 is that, due to the use of a radio unit 104, not only an unlocking of the padlock 10 by remote transmission by, for example, a smartphone or another mobile end device is possible, but that information about a detected state change (in particular a detected transition from the open position into the closed position of the lock hoop 12) may also be transmitted remotely by radio, for example, to a mobile end device.

In the case of the explained generator operation of the electric motor 46, the electrical energy acquired may be used to output a signal that represents information about a successful transition into the closed position of the lock hoop 12. Consequently, the battery 66 is not necessarily required for the output of such a signal (and thus in particular for the total locking process including the signal output to the external), i.e. the battery 66 may also be discharged or removed at this time.

As explained, in the embodiment shown, the electromechanical locking device 34 may mechanically block the rotating latch 36 electrically driven into the unlocking position, wherein the rotating latch 36 is (automatically) released only by the moving of the hoop 12 from the open position into the closed position. The advantage in particular results therefrom that the mechanical driving of the rotating latch 36 generated by the return spring 50 effects a defined rotational movement of the rotor of the electric motor 46 that generates a predetermined electrical voltage with a high reproducibility and reliability.

In deviation from the embodiment explained with reference to FIGS. 1 to 5, other embodiments are also possible in which a mechanical driving of a latch is effected by a moving of a securing part (such as the lock hoop 12) from the open position into the closed position and this driving of the latch—as a result of its drive-effective coupling with the rotor of the electric motor—may be detected by the control circuit.

For example, in accordance with an alternative embodiment, the control circuit 102 may be configured, after the electrical driving of a latch (corresponding to the rotating latch 36 in accordance with FIGS. 1 to 5) into the unlocking position, in particular after a predetermined time lapse, to control the electric motor 46 to return the latch into the locking position and hereby to relax the return spring 50. Due to a subsequent moving of the securing part (corresponding to the lock hoop 12 in accordance with FIGS. 1 to 5) from the open position into the closed position (due to a corresponding actuation by the user), the latch may be temporarily mechanically driven into the unlocking position (for example, in that the latch is urged back by the securing part), wherein the return spring 50 connected to the latch is hereby tensioned again. When the securing part (corresponding to the lock hoop 12 in accordance with FIGS. 1 to 5) has finally reached the closed position, the latch is urged from the unlocking position back into the locking position by a relaxation of the return spring 50. Thus, the (automatic) locking of the securing part to the lock body effects a mechanical driving of the latch that, via a drive-effective coupling, drives the rotor of the electric motor 46 to perform a corresponding rotational movement. The control circuit 102 may again be configured to utilize, for example to detect and to evaluate, this rotational movement of the rotor.

Figure 7:
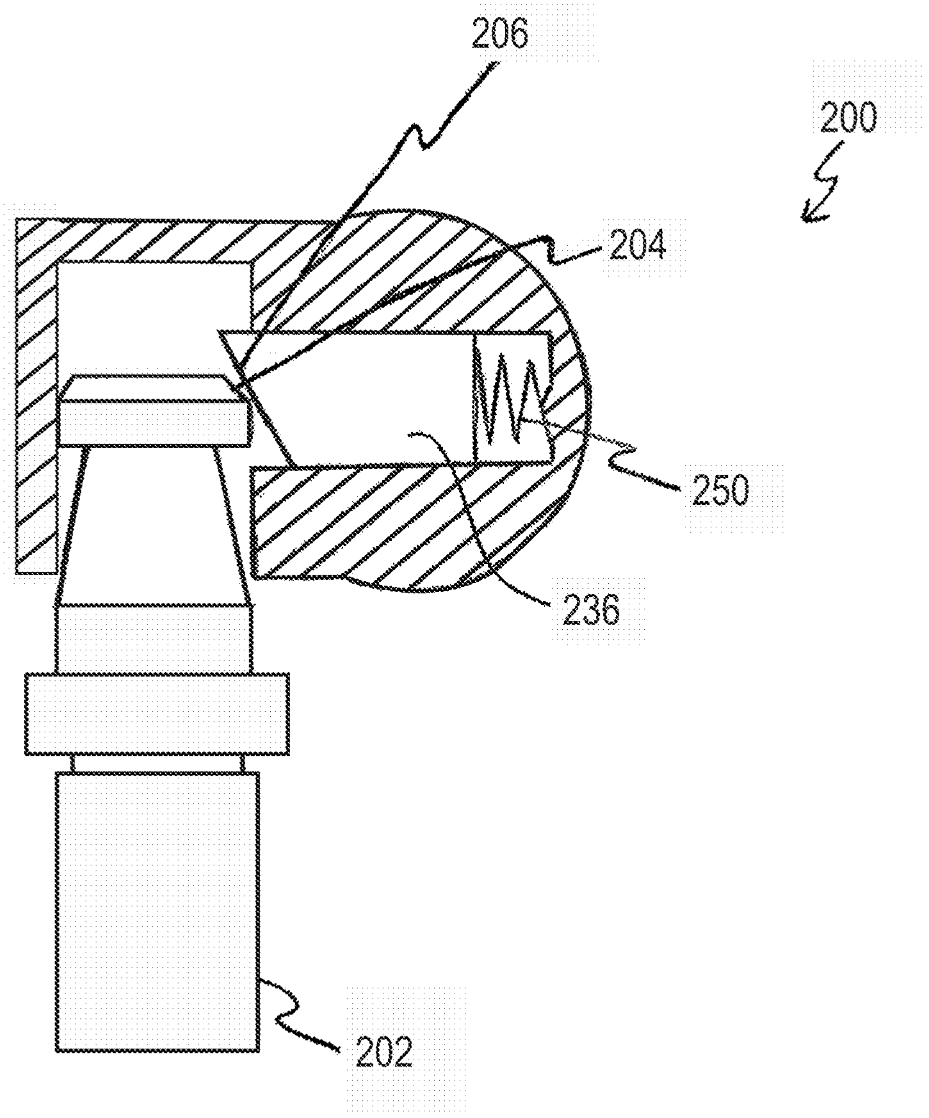
FIG. 7 shows a sectional representation of a securing part having guide slopes with a linearly movable latch.

Such an alternative embodiment may be realized particularly well with a linearly movable latch (instead of a rotating latch 36 in accordance with FIGS. 1 to 5). FIG. 7 shows a schematic representation of a securing part in the form of a bolt 202 in accordance with such an embodiment of an electronic lock. In this respect, a latch 236 is linearly movable and is preloaded in the locking direction via a return spring 250. The latch 236 is temporarily urged back via a first guide slope 204, which is attached to the front end of the bolt 202, and a second guide slope 206, which is formed at the latch 236, during the moving of the bolt 202 into the closed position. After a final reaching of the closed position of the bolt 202, the latch 236 may snap into the locking position due to the force of the return spring 250. Since the latch 236 is drive-effectively coupled to the rotor of the electric motor 46, the rotor moves accordingly and at least one of the mechanically caused latch movements (i.e. from the locking position into the unlocking position and/or from the unlocking position into the locking position) may be detected by the control circuit 102 (corresponding to FIG. 6). Such a linearly movable, preloaded latch 236 is, for example, known from DE 196 39 235 A1. Said latch 236 could, for example, be coupled to the rotor of the electric motor 46 via a gear rack, a pinion meshing therewith, and possibly a reduction gear unit, as is, for example, known from CN 210598521 U, in order to also drive the rotor by a mechanical driving of the latch 236.

In accordance with a further alternative embodiment, a return spring is not absolutely necessary. In such an embodiment, after an electrical driving of the latch into the unlocking position (in particular due to a corresponding unlocking command), the control circuit 102 may control the electric motor to electromechanically return the latch into the locking position. Due to a subsequent moving of the securing part (corresponding to the lock hoop 12 in accordance with FIGS. 1 to 5 or to the bolt 202 in accordance with FIG. 7) from the open position into the closed position, the latch (corresponding to the rotating latch 36 in accordance with FIGS. 1 to 5 or to the latch 236 in accordance with FIG. 7) may be displaced into the unlocking position and may thus be mechanically driven in order hereby to effect a forced rotational movement of the rotor of the electric motor 46. A suitable drive-effective coupling between the latch and the rotor may be provided for this purpose. The control circuit 102 may again be configured to detect and to evaluate this rotational movement of the rotor.

REFERENCE NUMERAL LIST

10 portable electronic lock
12 securing part
14 lock body
16 first hoop limb
18 second hoop limb
20 first introduction opening
22 second introduction opening
24 first reception passage
26 second reception passage
28 lock body cover
30 housing
32 transverse bore
34 locking device
36 rotating latch
38 first blocking element
40 second blocking element
42 first engagement recess
44 second engagement recess
46 electric motor
48 entrainer
50 return spring

52 flattened portion
54 blind bore
56 upper region
58 lower region
60 groove
62 ejection spring
64 plate head
66 energy source
68 battery compartment
70 first recess
72 second recess
74 direction of rotation
100 block diagram
102 control circuit
104 radio unit
106 rotational movement
108 voltage measurement device
110 switch element
200 schematic representation of a securing part having guide slopes
202 bolt
204 first guide slope
206 second guide slope
236 latch
250 return spring
A axis of rotation

The invention claimed is:

1. A portable electronic lock, comprising a lock body and a securing part that is movable relative to the lock body between a closed position and an open position, wherein the lock body comprises an electromechanical locking device that has an electric motor having a rotor, a latch coupled to the rotor, a return spring connected to the latch, and a control circuit;

wherein the rotor of the electric motor is configured to electrically drive the latch from a locking position, in which the securing part located in the closed position is locked to the lock body, into an unlocking position in which the securing part is released for a movement into the open position, thereby tensioning the return spring;

wherein the return spring is configured to mechanically drive the latch from the unlocking position into the locking position when the return spring relaxes, thereby forcing a rotational movement of the rotor, wherein a relaxation of the return spring is triggered by moving of the securing part from the open position into the closed position; and wherein the electric motor is configured to generate an electrical voltage on the basis of the forced rotational movement of the rotor.

2. The portable electronic lock in accordance with claim 1, wherein the electromechanical locking device is configured to mechanically block the latch in the unlocking position when the latch is electrically driven into the unlocking position and the securing part is moved into the open position, and to release the latch for being mechanically driven from the unlocking position into the locking position only by the moving of the securing part from the open position into the closed position.

3. The portable electronic lock in accordance with claim 1, wherein the latch is configured as a rotating latch.

4. The portable electronic lock in accordance with claim 1, wherein the electric motor is configured to generate the electrical voltage by induction on the basis of the forced rotational movement of the rotor.

5. The portable electronic lock in accordance with claim 1, wherein the control circuit is configured to detect the electrical voltage generated by the electric motor.

6. The portable electronic lock in accordance with claim 1, comprising a rechargeable electrical energy store that is configured to store at least a portion of the generated electrical voltage as electrical energy.

7. The portable electronic lock in accordance with claim 6, wherein the control circuit is configured to use the electrical energy stored on the basis of the generated electrical voltage to outwardly output a signal.

8. The portable electronic lock in accordance with claim 1, wherein the control circuit is configured, in an unlocking operation, to drive the electric motor to perform an electrical driving of the latch from the locking position into the unlocking position, wherein the control circuit is further configured, in a detection operation following the unlocking operation, to detect the electrical voltage generated by the electric motor or to store it as electrical energy.

9. The portable electronic lock in accordance with claim 1, wherein the portable electronic lock comprises a radio unit, wherein the control circuit is connected to the radio unit, wherein the control circuit is configured to receive a control command for the electromechanical locking device via the radio unit and to control the electric motor in response to the received control command.

10. The portable electronic lock in accordance with claim 1, wherein the rotor of the electric motor is coupled to the latch via a reduction gear unit that is not self-locking.

11. The portable electronic lock in accordance with claim 1, wherein the securing part is a hoop and has two ends, wherein the hoop can be introduced with both ends into the lock body and can be locked with one end or with both ends to the lock body; or wherein the securing part has at least one bolt that can be introduced into the lock body and that can be locked to the lock body.

12. The portable electronic lock in accordance with claim 2, wherein the control circuit is configured, after the electrical driving of the latch into the unlocking position and the mechanical blocking of the latch in the unlocking position, to control the electric motor to slightly rotate the rotor back in the locking direction in order to relieve the rotor.

13. The portable electronic lock in accordance with claim 5, wherein the control circuit is configured to evaluate a value of the generated electrical voltage by a comparison with a threshold value.

14. The portable electronic lock in accordance with claim 1, wherein the portable electronic lock comprises a radio unit, wherein the control circuit is connected to the radio unit, wherein the control circuit is configured to transmit a state information, which represents a position of the securing part, or a control command via the radio unit as a radio signal.

15. The portable electronic lock in accordance with claim 1, wherein the rotor of the electric motor is coupled with clearance to the latch.

16. A portable electronic lock, comprising a lock body and a securing part that is movable relative to the lock body between a closed position and an open position;

wherein the lock body comprises an electric motor having an electrically driven rotor, a rotatable latch that is drive-effectively coupled to the rotor, and a return spring;

wherein the rotor is configured to selectively drive the latch for rotation from a locking position, in which the securing part located in the closed position is locked to the lock body, into an unlocking position, in which the securing part is released for a movement into the open position;

wherein the return spring is configured to mechanically drive the latch for rotation from the unlocking position into the locking position, wherein the mechanical driving of the latch is triggered by a moving of the securing part from the open position into the closed position;

with the latch being drive-effectively coupled to the rotor of the electric motor such that the mechanical driving of the latch effects a forced rotational movement of the rotor, wherein the electric motor generates an electrical voltage due to the forced rotational movement of the rotor.

17. The portable electronic lock in accordance with claim 16, wherein the return spring is configured to be tensioned by the driving of the latch from the locking position into the unlocking position.

18. The portable electronic lock in accordance with claim 16, wherein the lock body comprises two radially movable blocking elements that are driven by the rotatable latch;

wherein the securing part is a hoop and has two hoop limbs, each hoop limb having an engagement recess;

wherein the latch urges the blocking elements radially outwardly into engagement with the engagement recesses of the two hoop limbs when the securing part is in the closed position and the latch is in the locking position;

wherein one of the two hoop limbs blocks the latch in the unlocking position through one of the two blocking elements when the securing part is in the open position; and wherein by displacing the securing part from the open position into the closed position the engagement recess of said one of the two hoop limbs releases a the one of the two blocking elements for a radially outward movement, thereby releasing the latch for being driven for rotation from the unlocking position into the locking position by the return spring.

19. The portable electronic lock in accordance with claim 16, comprising a control circuit that is configured to detect the electrical voltage generated by the electric motor.

20. The portable electronic lock in accordance with claim 16, comprising a rechargeable electrical energy store that is configured to store at least a portion of the generated electrical voltage as electrical energy.

* * * * *